(12) United States Patent
Naruoka et al.

(10) Patent No.: US 9,850,863 B2
(45) Date of Patent: Dec. 26, 2017

(54) AIR INTAKE DUCT OF SADDLE-RIDDEN VEHICLE

(71) Applicant: Kawasaki Jukogyo Kabushiki Kaisha, Hyogo (JP)

(72) Inventors: Shohei Naruoka, Kakogawa (JP); Hisatoyo Arima, Himeji (JP); Satoaki Ichi, Akashi (JP); Hiroyuki Watanabe, Kobe (JP); Kozo Arai, Kobe (JP); Yoshinobu Tanaka, Hyogo (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 367 days.

(21) Appl. No.: 14/590,911

(22) Filed: Jan. 6, 2015

(65) Prior Publication Data
US 2015/0114599 A1    Apr. 30, 2015

Related U.S. Application Data

(63) Continuation of application No. PCT/JP2013/068912, filed on Jul. 10, 2013.

(30) Foreign Application Priority Data

Jul. 11, 2012 (JP) .................................. 2012-155462

(51) Int. Cl.
*F02M 35/14* (2006.01)
*F02M 35/10* (2006.01)
(Continued)

(52) U.S. Cl.
CPC .............. *F02M 35/14* (2013.01); *B62J 25/00* (2013.01); *B62J 37/00* (2013.01); *B62K 11/04* (2013.01);
(Continued)

(58) Field of Classification Search
CPC F01P 1/06; B60K 13/02; F02M 35/14; F02M 35/162; F02M 35/10013;
(Continued)

(56) References Cited

U.S. PATENT DOCUMENTS 6,422,332 B1 * 7/2002 Takata .................... F02B 61/02
123/41.01
7,412,960 B2    8/2008 Nishizawa
(Continued)

FOREIGN PATENT DOCUMENTS

CN        1721685      1/2006
CN      102549250      7/2012
(Continued)

OTHER PUBLICATIONS

Notification of Reason(s) for Rejection dated Dec. 22, 2015 for counterpart Japanese Patent Application JP2014-524852 (w/ English Language Summary), 5 pages.
(Continued)

*Primary Examiner* — Jacob Amick

(57) ABSTRACT

An air intake duct of a motorcycle extends rearwardly from a front portion of a motorcycle body so as to pass laterally of the left side of a motorcycle frame structure, and incoming wind is supplied as an intake air through the air intake duct to a combustion engine. The air intake duct is divided in a widthwise direction of the motorcycle. An upper dividing face of the air intake duct is disposed inward of an intermediate position, in a motorcycle widthwise direction, of the air intake duct.

15 Claims, 11 Drawing Sheets

(51) Int. Cl.
*F02B 27/00* (2006.01)
*F02M 35/16* (2006.01)
*B62K 11/04* (2006.01)
*F01P 1/06* (2006.01)
*F02B 33/40* (2006.01)
*B62J 25/00* (2006.01)
*B62J 37/00* (2006.01)
*F02B 33/44* (2006.01)
*F02B 37/00* (2006.01)
*F02B 61/02* (2006.01)

(52) U.S. Cl.
CPC ............. *F01P 1/06* (2013.01); *F02B 27/005* (2013.01); *F02B 33/40* (2013.01); *F02B 33/44* (2013.01); *F02M 35/10* (2013.01); *F02M 35/10013* (2013.01); *F02M 35/10078* (2013.01); *F02M 35/10111* (2013.01); *F02M 35/10144* (2013.01); *F02M 35/10157* (2013.01); *F02M 35/162* (2013.01); *F02B 37/00* (2013.01); *F02B 61/02* (2013.01); *Y02T 10/146* (2013.01)

(58) Field of Classification Search
CPC ....... F02M 35/10111; F02M 35/10144; F02M 35/10157; F02B 27/005
See application file for complete search history.

(56) References Cited

U.S. PATENT DOCUMENTS

| 8,646,438 B2 | 2/2014 | Saeki et al. |
| 9,127,591 B2 | 9/2015 | Arima et al. |
| 2006/0005801 A1 | 1/2006 | Nishizawa |
| 2010/0221107 A1 | 9/2010 | Anschel et al. |
| 2012/0186565 A1 | 7/2012 | Arima et al. |
| 2012/0260896 A1 | 10/2012 | Saeki et al. |

FOREIGN PATENT DOCUMENTS

| EP | 1614889 | 1/2006 |
| JP | 57-137531 | 2/1956 |
| JP | 62-61867 | 4/1987 |
| JP | 63-121769 | 8/1988 |
| JP | 02-070920 | 3/1990 |
| JP | 06-147044 A | 5/1994 |
| JP | 07-069265 | 3/1995 |
| JP | 2799930 B | 7/1998 |
| JP | 10-274113 | 10/1998 |
| JP | 2002-048021 | 2/2002 |
| JP | 2006-282143 | 10/2006 |
| JP | 2011-230649 | 11/2011 |
| WO | WO2011/046096 | 4/2011 |
| WO | 2011/080974 | 7/2011 |
| WO | 2011/117919 | 9/2011 |

OTHER PUBLICATIONS

Extended and Supplementary European Search Report dated May 11, 2016 for corresponding European Patent Application No. 13816162.5; 6 pages.
Decision of Rejection dated May 24, 2016 with English Language Translation Summary for corresponding Japanese Patent Application No. 2014-524852 dated May 24, 2016; 5 pages.
First Office Action dated Jun. 2, 2016 with and English Language Translation of Search Report of First Office Action for corresponding Chinese Patent Application No. 201380036432.1; 7 pages.
PCT Application No. PCT/JP2013/068912 International Preliminary Report on Patentability dated Jan. 22, 2015, 9 pages.
PCT/JP2013/068912 International Search Report, dated Sep. 6, 2013, 2 pages.
Second Office Action dated Feb. 8, 2017 for Corresponding Chinese Patent Application No. 201380036432.1 with English Language Summary (5 pages).
Third Office Action dated Jul. 24, 2017 for Corresponding Chinese Patent Application No. 201380036432.1 with English Language Summary (4 pages).
Communication pursuant to Article 94(3) EPC dated Jul. 11, 2017 for Corresponding European Patent Application No. 13816162.5 (4 pages).
Second Office Action dated Sep. 21, 2017 for Corresponding European Patent Application No. 13816162.5 (3 pages).

* cited by examiner

AIR INTAKE DUCT OF SADDLE-RIDDEN VEHICLE

CROSS REFERENCE TO THE RELATED APPLICATION

This application is a continuation application, under 35 U.S.C §111(a) of international application No. PCT/JP2013/068912, filed Jul. 10, 2013, which claims priority to Japanese patent application No. 2012-155462, filed Jul. 11, 2012, the entire disclosure of which is herein incorporated by reference as a part of this application.

BACKGROUND OF THE INVENTION

Field of the Invention

The present invention relates to an air intake duct of a saddle-riding type vehicle for supplying incoming wind as an intake air to a combustion engine.

Description of Related Art

An engine, mounted to a saddle-riding type vehicle such as a motorcycle has been known, in which a supercharger is disposed rearwardly of a cylinder block, and an air intake duct introduces air taken in from above the engine as intake air to the supercharger (for example, Patent Document 1).

PRIOR ART LITERATURE

[Patent Document 1] JP Laid-open Patent Publication No. H02-070920

The air intake duct disposed above the engine as described in Patent Document 1 needs to be curved in order to avoid interference with the engine. Various devices are disposed around the engine, and therefore, there is a difficulty in curving the air intake duct in a limited space around the engine so as to avoid interference with the engine or such devices.

SUMMARY OF THE INVENTION

In view of the aforementioned problem, an object of the present invention is to provide an air intake duct, of a saddle-riding type vehicle, which can be easily formed even when the duct includes a curve portion.

In order to attain the aforementioned object, the present invention provides an air intake duct of a saddle-riding type vehicle which extends rearwardly from a front portion of a vehicle body so as to pass laterally by one side of a vehicle body frame structure in a widthwise direction of the vehicle, and through which incoming wind is supplied as an intake air to a combustion engine, and the air intake duct includes an outer half part and an inner half part divided in the widthwise direction.

According to this configuration, since the air intake duct is divided into two parts in the widthwise direction, the air intake duct can be formed by molding. As a result, even in a case where the air intake duct is curved in at least one of the up-down direction or vertical direction and the left-right direction or widthwise direction, the air intake duct can be easily formed.

In the present invention, a part of a side surface of the air intake duct is preferably exposed to the outside and used for a vehicle. According to this configuration, since no partition line or dividing line is provided on the side surface, an outer appearance may not be degraded even when the air intake duct is exposed.

In the present invention, when the air intake duct includes upper and lower dividing faces and the intake air is supplied through a supercharger to the combustion engine, the upper dividing face is preferably disposed inward of an intermediate position, in a vehicle body widthwise direction, of the air intake duct on an inner side of the vehicle body, and a part of an upper surface of the air intake duct is preferably exposed to the outside. According to this configuration, even in a case where a part of the upper surface of the air intake duct is exposed to the outside, the inner half part is less likely to be exposed to the outside. As a result, only the outer half part can be formed as a design component to improve an outer appearance, while the inner part can be produced at low cost.

When the upper dividing face is disposed on the inner side of the vehicle body, the air intake duct preferably passes above a radiator for cooling water with which the combustion engine is cooled. When the air intake duct passes above the radiator, incoming wind that has passed through the radiator is prevented from being blocked by the air intake duct. On the other hand, although the air intake duct is easily seen from a rider, the upper dividing face is disposed on the inner side of the vehicle body, and therefore, the partition line along the upper dividing face may not be outstanding.

When the upper dividing face is disposed on the inner side of the vehicle body, the air intake duct preferably passes laterally of an outer side of a front fork. When the air intake duct passes laterally of the outer side of the front fork, a cross-sectional area of the air intake duct can be increased as compared to a case where the air intake duct is disposed between the left and right front forks. On the other hand, although the air intake duct is easily seen from a rider, the upper dividing face is disposed on the inner side of the vehicle body, and therefore, the partition line along the upper dividing face may not be outstanding.

When the upper dividing face is disposed on the inner side of the vehicle body, the lower dividing face is preferably disposed outward of the upper dividing face in the widthwise direction. According to this configuration, the inner half part is less likely to be flattened, and therefore, rigidity of the air intake duct can be enhanced.

When the upper dividing face is disposed on the inner side of the vehicle body, the outer half part and the inner half part are preferably joined to each other such that an inner side end portion of the outer half part and an outer side end portion of the inner half part butt each other. According to this configuration, an uneven portion is less likely to be formed in the inner peripheral surface of the air intake duct. As a result, unevenness of a flow of the intake air in the air intake duct is reduced.

In a case where the outer half part and the inner half part are joined to each other so as to butt each other, the inner side end portion, on an upper side, of the outer half part preferably includes: a joining portion that butts the outer side end portion of the inner half part; and a projection formed above the joining portion and projecting toward the inner side of the vehicle body beyond the joining portion. According to this configuration, the upper joining portion is hidden by the projection to further improve an outer appearance with enhanced effectiveness.

When the upper dividing face is disposed on the inner side of the vehicle body, a fixing portion for fixing the air intake duct to the vehicle body frame structure is preferably formed on an outer surface of the inner half part. According to this configuration, the fixing portion is less likely to appear in the outer appearance of the vehicle body, and therefore, the outer appearance of the vehicle body can be prevented from being degraded.

When the upper dividing face is disposed on the inner side of the vehicle body, the air intake duct is preferably disposed on a lateral side on which a side stand is disposed. The upper dividing face is easily seen when the vehicle is at stoppage. However, according to this configuration, the air intake duct is disposed at a lower side of tilt when the vehicle is at stoppage, and therefore, the dividing line may not be outstanding.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, a preferred embodiment of the present invention will be described with reference to the accompanying drawings. The terms "left" and "right" used in the description in this specification are relative terms denoting respective position and/or directions relative to a motorcycle driver maneuvering the motorcycle to travel forwards.

Figure 1:
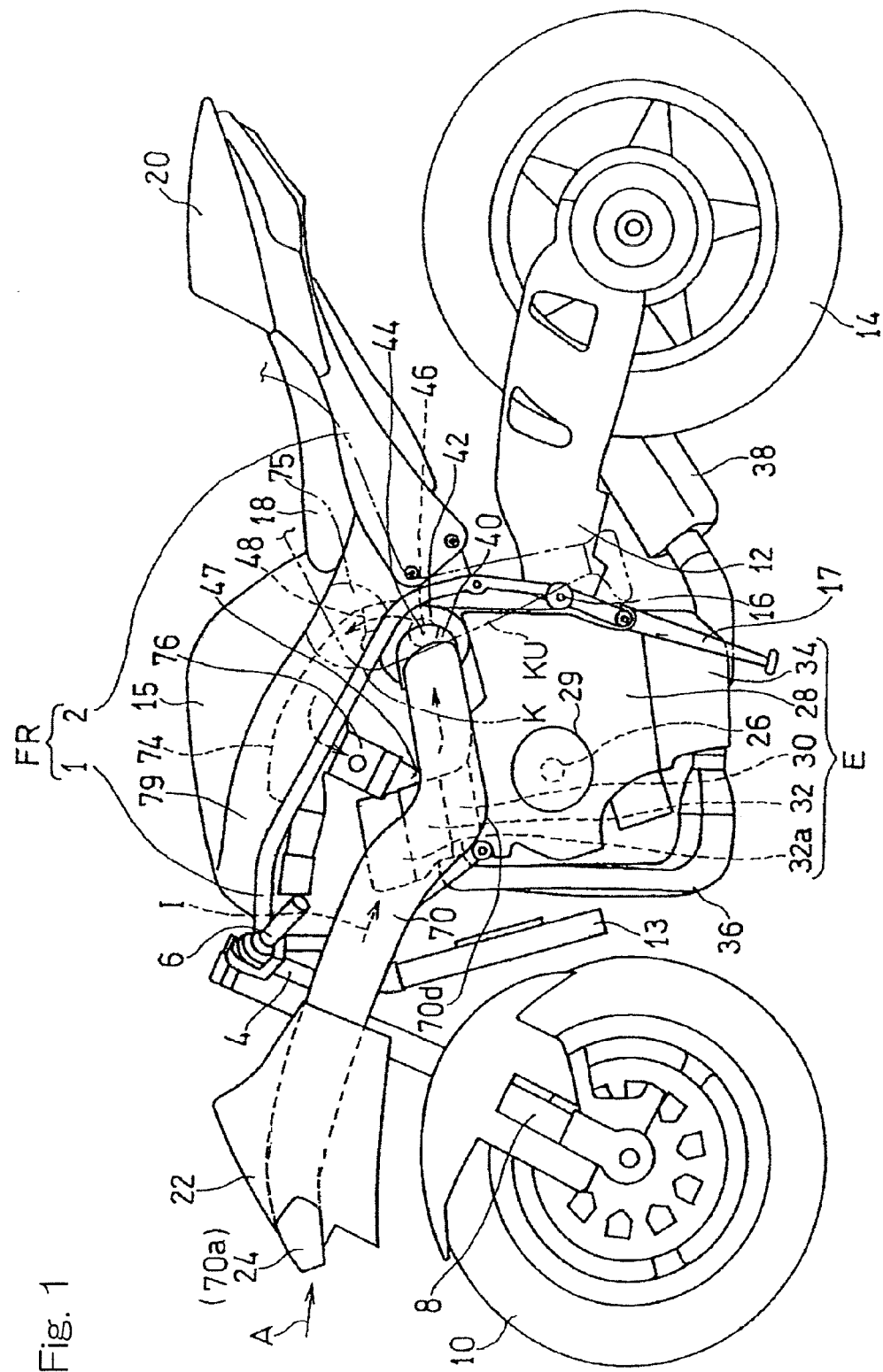
FIG. 1 is a side view of a motorcycle, which is one type of a saddle-riding type vehicle, having an air intake duct mounted therein according to a first embodiment of the present invention.

FIG. 1 is a side view of a motorcycle, which is one type of a saddle-riding type vehicle, having an air intake duct mounted therein according to a first embodiment of the present invention. A motorcycle frame structure FR for the motorcycle includes a main frame 1 which forms a front half of the motorcycle frame structure FR, and a seat rail 2, mounted on a rear portion of the main frame 1, which forms a rear half of the motorcycle frame structure FR. The main frame 1 has a front end provided with a head pipe 4, and a front fork 8 is rotatably supported by this head pipe 4 through a not-illustrated steering shaft. A front wheel 10 is fitted to the front fork 8, and a steering handle 6 for operation is fixed to an upper end portion of the front fork 8.

Meanwhile, a swingarm 12 is supported by a rear end portion of the main frame 1, which is a lower intermediate portion of the motorcycle frame structure FR, for movement in up and down direction about a pivot pin 16. A rear wheel 14 is rotatably supported by a rear end portion of the swingarm 12. A combustion engine E is fitted to the lower portion of the main frame 1. A radiator 13 for engine cooling water is disposed forwardly of the combustion engine E. Rotation of the combustion engine E is transmitted to a transmitting member (not shown) such as a chain, to drive the rear wheel 14 via the transmitting member. A side stand 17 is supported at the rear end of the main frame 1 on the left side of a motorcycle body, such that the side stand 17 can be lifted up and down.

A fuel tank 15 is disposed on an upper portion of the main frame 1 and a driver's seat 18 and a fellow passenger's seat 20 are supported by the seat rail 2. Further, a front fairing or cowl 22 made of a resinous material is mounted on a front portion of the motorcycle body so as to cover a front portion of the head pipe 4. The front cowl 22 has an air intake port 24 through which air is taken from the outside into the combustion engine E.

The air intake port 24 is opened forward of the motorcycle body, whereby an amount of intake air to the combustion engine E can be increased by utilizing wind pressure of incoming wind A. The air intake port 24 is disposed on the front surface of the front cowl 22, so as to be disposed at the front end portion of the front cowl 22 at which a dynamic pressure of the incoming wind is maximum. Thus, lateral projection of the air intake port 24 from the front cowl 22 is reduced as compared to a case where the air intake portion is disposed so as to project on the side portion of the front cowl 22. As a result, the air intake port 24 may not be outstanding, to improve an outer appearance of the motorcycle.

The combustion engine E is a parallel multicylinder combustion engine, such as a parallel four cylinder, four-stroke cycle combustion engine, and has an engine rotary shaft 26 that extends in a motorcycle widthwise direction or a left-right direction. A type of the combustion engine E is not necessarily limited thereto. The combustion engine E includes: a crankcase 28 for supporting the engine rotary shaft 26; a cylinder block 30 connected to an upper portion of the crankcase 28; a cylinder head 32 connected to an upper portion of the cylinder block 30; a head cover 32a mounted on an upper portion of the cylinder head 32; and an oil pan 34 mounted to a lower portion of the crankcase 28.

The cylinder block 30 and the cylinder head 32 are slightly tilted forward. Specifically, a piston axis line of the combustion engine E extends upward so as to be tilted forward. Air intake ports 47 are provided in the rear portion of the cylinder head 32. Four exhaust pipes 36, connected to exhaust ports in a front surface of the cylinder head 32, are merged together below the combustion engine E, and are connected to an exhaust muffler 38 disposed at the right side of the rear wheel 14. A supercharger 42 is disposed rearwardly of the cylinder block 30 an above the crankcase 28.

The supercharger 42 compresses the outside air taken in through a suction port 46, and discharges, after enhancing the pressure of the air, the air through a discharge port 48, to supply the air to the combustion engine E. Thus, an amount of intake air to be supplied to the combustion engine E can be increased. The supercharger 42 includes: a supercharger rotary shaft 44 that extends in the motorcycle widthwise direction; the suction port 46 disposed above the rear portion of the crankcase 28 so as to be opened leftward; and the discharge port 48 disposed at the intermediate portion, in the motorcycle widthwise direction, of the combustion engine E in the rear of the supercharger rotary shaft 44 so as to be opened upward.

Figure 2:
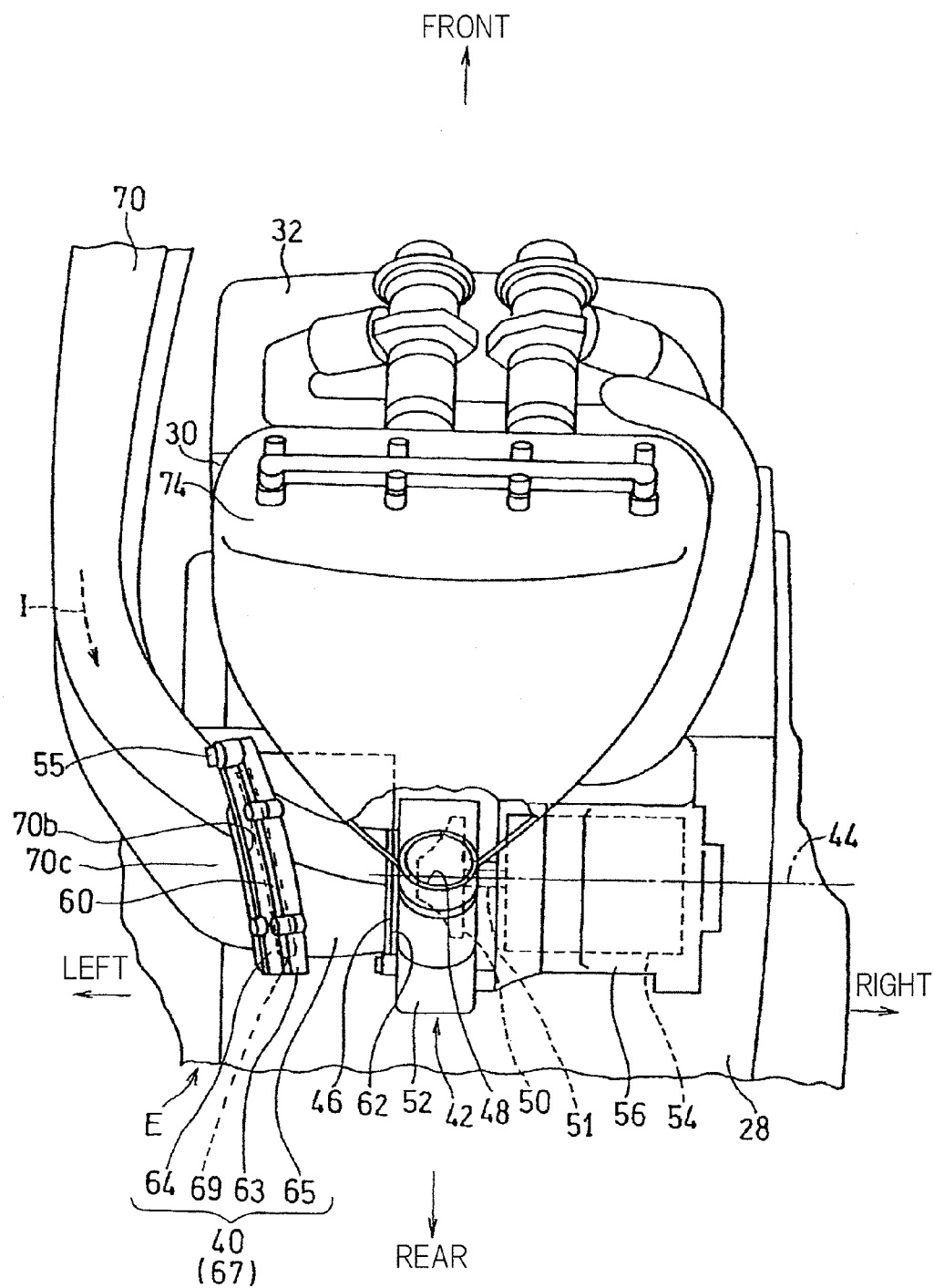
FIG. 2 is a perspective view of a main portion of the motorcycle as viewed from diagonally above a rear portion thereof.

As shown in FIG. 2, the supercharger 42 includes: an impeller 50 for pressurizing intake air; an impeller housing 52 for covering the impeller 50; a transmission mechanism 54 for transmitting power of the combustion engine E to the impeller 50; and a transmission mechanism housing 56 for covering the transmission mechanism 54. The transmission mechanism 54 is implemented as, for example, a speed increaser or a speed increasing gear. The transmission mechanism 54 and an air cleaner 40 are disposed so as to interpose the impeller housing 52 therebetween in the motorcycle widthwise direction. The impeller housing 52 is connected to the transmission mechanism housing 56 and the air cleaner 40 by means of not-illustrated bolts. However, the structure of the supercharger 42 is not necessarily limited to that of the present embodiment.

The suction port 46 of the supercharger 42 is disposed inward of the left side surface of the cylinder block 30 in the motorcycle widthwise direction. Thus, the supercharger 42 does not project laterally outward of the left side surface of the cylinder block 30, and an assembly of the combustion engine E and the supercharger 42 is made compact. A cleaner outlet 62 of the air cleaner 40 is connected to the suction port 46, and an air intake duct 70, through which the incoming wind A (FIG. 1) flowing forwardly of the cylinder block 30 is introduced to the supercharger 42, is connected to a cleaner inlet 60 of the air cleaner 40 from the outer side in the motorcycle widthwise direction. The cleaner inlet 60 and a discharge port 70b of the air intake duct 70 are connected to each other by connecting flanges 63, 64 provided on outer peripheries thereof, respectively, by means of a plurality of bolts 55.

A cleaner element 69 for cleaning intake air I is interposed between the connecting flanges 63 and 64 that form an upstream end portion of the air cleaner 40. A cleaner body 65 forming a cleaning chamber is provided downstream of the connecting flanges 63, 64. The intake air I, when passing through the cleaner element 69, is cleaned and flow-regulated. That is, the cleaner element 69 also functions as a suppressing member for suppressing unevenness of the intake air I in an air intake passage 77 (FIG. 7) provided upstream of the suction port 46 of the supercharger 42. As such a suppressing member other than the cleaner element 69 of the air cleaner 40, a perforated metal may be used.

An air intake chamber 74 is disposed between the discharge port 48 of the supercharger 42 and the air intake ports 47 of the combustion engine E shown in FIG. 1. The air intake chamber 74 accumulates intake air to be supplied to the air intake ports 47 from the supercharger 42. The air intake chamber 74 is disposed above the supercharger 42 and rearwardly of the cylinder block 30. As shown in FIG. 2, the discharge port 48 of the supercharger 42 is connected to the intermediate portion, in the motorcycle widthwise direction, of the air intake chamber 74. Thus, the intake air evenly flows from the supercharger 42 through the air intake chamber 74 to a plurality of the air intake ports 47.

As shown in FIG. 1, a throttle body 76 is disposed between the air intake chamber 74 and the cylinder head 32. A fuel is injected into the intake air within the throttle body 76 to produce an air/fuel mixture, and the mixture is supplied into a cylinder. The fuel tank 15 is disposed above the air intake chamber 74 and the throttle body 76.

The air intake duct 70 forms the air intake passage 77 (FIG. 7) through which intake air is supplied to the supercharger 42, and the air intake duct 70 is disposed on the left side of the motorcycle body, on which the side stand 17 is also disposed. A passage area of the air intake passage 77 is set so as to be gradually reduced, from the air intake port 24 disposed in the front end, toward a downstream portion 70c (FIG. 2) that is disposed in the rear end to connect to the supercharger 42. In the description herein, "gradually reduced" means that the passage area may be reduced as a whole and may include a portion having a partially constant passage area.

Figure 4:
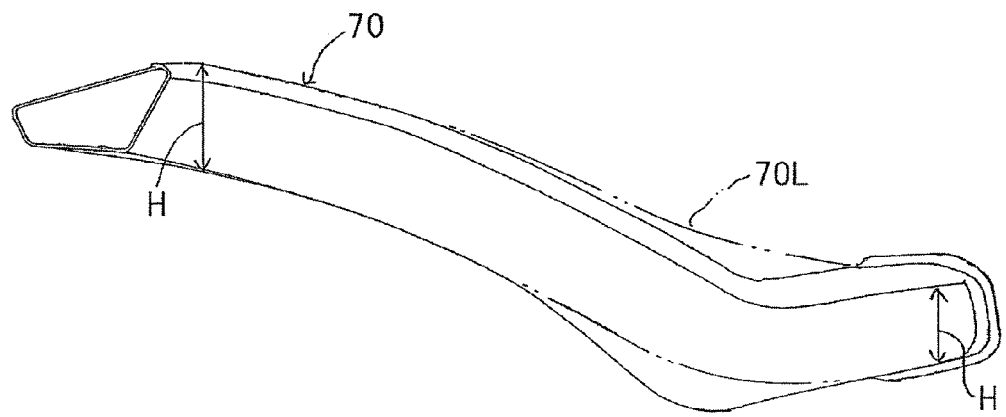
FIG. 4 is a side view of the air intake duct.
Figure 5:
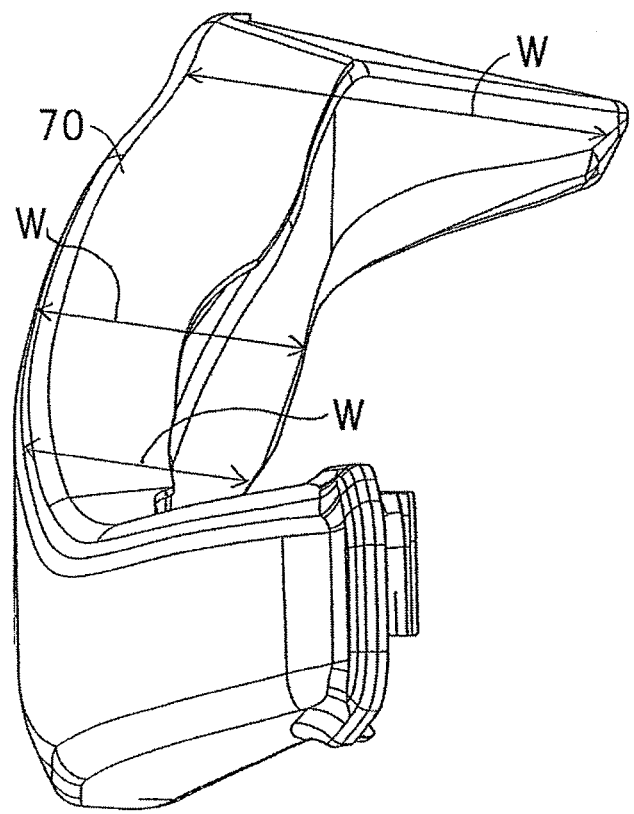
FIG. 5 is a rear view of the air intake duct.

The passage area of the air intake passage 77 is set so as to be varied by at least one of a dimension of a cross-section of the air intake duct 70 in the vertical direction and a dimension thereof in the widthwise direction being gradually reduced towards the rearward. In the present embodiment, as shown in FIG. 4 and FIG. 5, both a dimension H in the vertical direction and a dimension W in the widthwise direction are varied.

Since the cross-sectional area of the air intake duct 70 is gradually reduced towards the rearward, a portion of the air intake duct 70 shown in FIG. 1, which is exposed to the outside of the motorcycle body in the rear portion, can be reduced. In other words, a portion of the rear portion of the air intake duct 70, which portion is near a leg of a rider, can be reduced. Thus, interference between the air intake duct 70 and a leg of a rider can be prevented. As a result, a driving position of the rider can be prevented from being tight or a rider having a large body can easily drive the motorcycle.

The air cleaner 40 forms a connecting portion 67 that is provided in the downstream portion 70c of the air intake duct 70 and that has an increased passage area, or a passage area is creased than an upstream portion thereof. The upstream end portion of the connecting portion 67 is formed by the connecting flanges 63, 64 and the connecting portion body of the connecting portion 67 is formed by the cleaner body 65. The cleaner outlet 62 in the cleaner body 65 acting as the connecting portion body is connected to the supercharger 42 and is set so as to have a passage area that is less than an area of the cleaner inlet 60 at which the cleaner element 69 is disposed.

As is clear from FIG. 1, the air intake duct 70 has a lowermost portion 70d at its intermediate portion in a flow direction in which the intake air I flows. Thus, by providing the lowermost portion 70d at the intermediate portion, the air intake duct 70 can be V-shaped in the lateral view. However, the shape of the air intake duct 70 is not necessarily limited to such a V-shape, and may be a straight shape. Specifically, as indicated by a double dotted line in FIG. 4, an air intake duct 70L may extend so as to be gradually tilted downward towards the rear in the lateral view. Thus, resistance or drag of intake air can be reduced.

Figure 3:
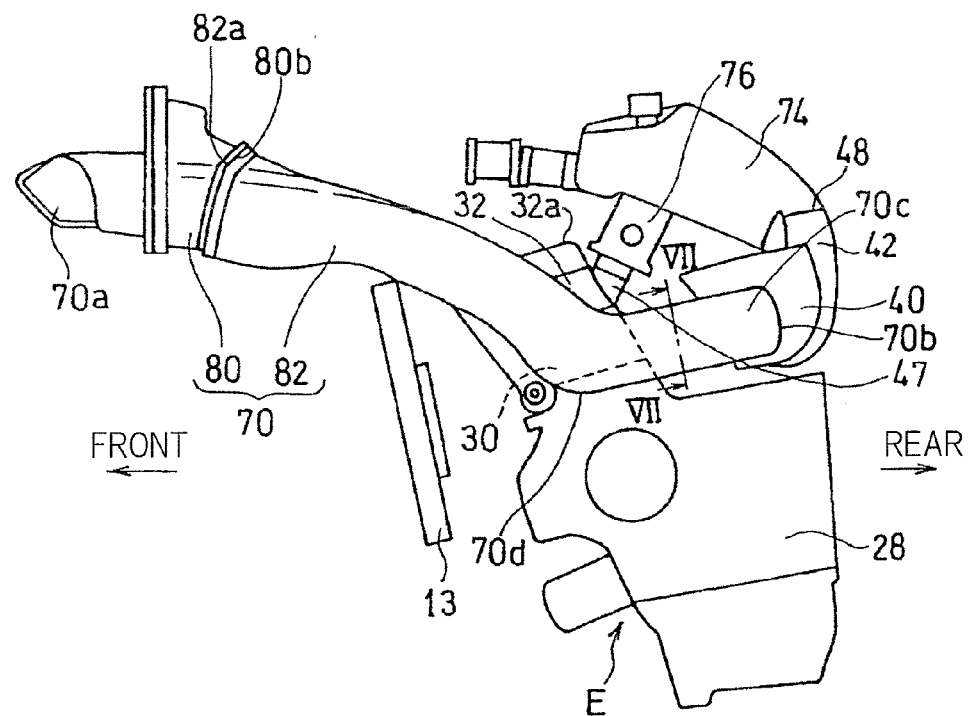
FIG. 3 is a side view of a main portion of the motorcycle.

The air intake duct 70 includes a ram duct unit 80 on the upstream side and an intake duct unit 82 on the downstream side as shown in FIG. 3. The ram duct unit 80 is supported by the main frame 1 so as to face a front end opening 70*a* thereof shown in FIG. 1 toward the air intake port 24 of the front cowl 22, and thus, pressure of air introduced through the opening 70*a* is enhanced by the ram effect. A front end portion 82*a* of the intake duct unit 82 is connected to a rear end portion 80*b* of the ram duct unit 80 shown in FIG. 3. The discharge port 70*b* that is a rear end portion of the intake duct unit 82 is connected to the cleaner inlet 60 (FIG. 2) of the air cleaner 40.

The ram duct unit 80 is disposed frontwardly the head pipe 4, and is, for example, fixed to the front cowl 22 (FIG. 1). The inside of the head pipe 4 may serve as a portion of the air intake passage 77 (FIG. 7) in the ram duct unit 80.

Figure 6:
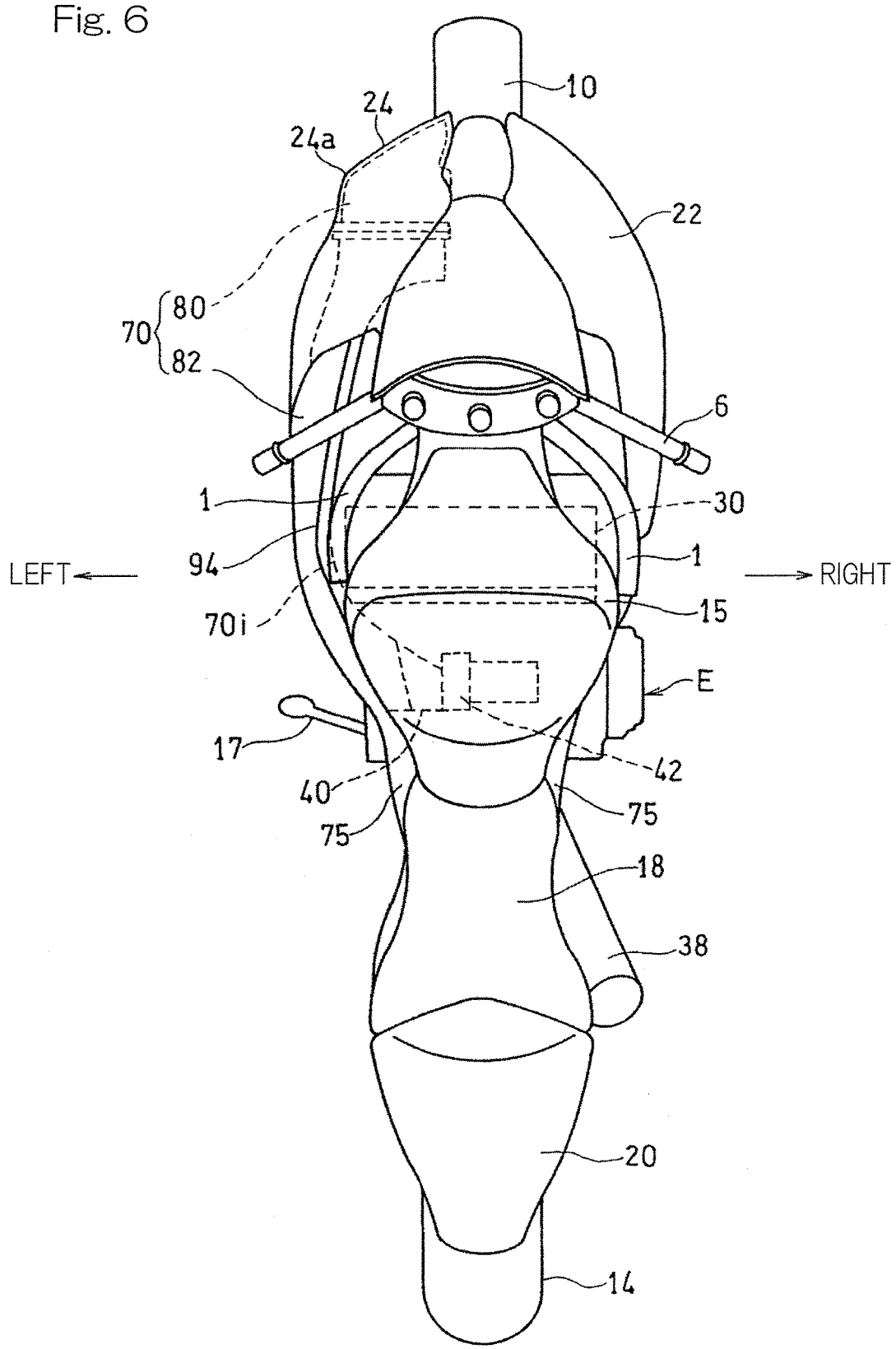
FIG. 6 is a plan view of the motorcycle.

The front end opening 70*a* of the ram duct unit 80 acts as the introduction port 70*a* of the air intake duct 70. As shown in FIG. 6, the introduction port 70*a* (the air intake port 24) of the air intake duct 70 is laterally elongated, and is disposed frontwardly of the head pipe 4 and in the left side portion of the motorcycle body. Thus, a distance from the introduction port 70*a* to the supercharger 42 as shown in FIG. 6 can be reduced and a curvature of the air intake duct 70 can be reduced, as compared to a case where the introduction port 70*a* is disposed at the intermediate portion in the motorcycle widthwise direction.

The opening edge of the air intake port 24 extends rearwardly so as to be tilted outward in the motorcycle widthwise direction, in a planar view. An outermost side end 24*a*, in the motorcycle widthwise direction, of the air intake port 24 is disposed outward of an inner side surface 70*i*, in the motorcycle widthwise direction, of an outermost curved portion of the air intake duct 70. Thus, intake air is easily introduced also to an outer side portion inside the air intake duct 70 that is curved outward.

In the present embodiment, the introduction port 70*a* and the discharge port 70*b* of the air intake duct 70 are disposed inward of the outer side surfaces of the motorcycle frame structure FR and the combustion engine E. On the other hand, the intermediate portion, in the front-rear direction, of the air intake duct 70 is disposed outward of the outer side surfaces of the motorcycle frame structure FR and the combustion engine E.

However, the introduction port 70*a* of the air intake duct 70 may be disposed anywhere on the front surface, and for example, may be disposed near the front end portion that is a foremost portion at the intermediate portion, in the motorcycle widthwise direction, of the front cowl 22 shown in FIG. 6. In this case, the incoming wind A in a high pressure state can be introduced to the supercharger 42.

The air intake duct 70 is disposed outward of the main frame 1 in the widthwise direction. Thus, interference between the air intake duct and the main frame 1 can be prevented while increase of the dimension, in the widthwise direction, of the main frame 1 can be suppressed. In the present embodiment, the main frame 1 is an outermost side portion of the motorcycle body except for the air intake duct 70. A knee grip portion 75 is formed frontwardly of the driver's seat 18 so as to have a dimension reduced in the motorcycle widthwise direction, and the air intake duct 70 projects laterally outward of the main frame 1 in front of the knee grip portion 75. The knee grip portion 75 is formed in the rear portion of a tank side cover 79 that covers the outside of a lower portion of the fuel tank 15 shown in FIG. 1.

The intake duct unit 82 smoothly connects between the ram duct unit 80 and the supercharger 42. The intake duct unit 82 is tilted downward towards the rear from the ram duct unit 80, while bulging leftward, and passes laterally of the cylinder block 30. That is, as shown in FIG. 6, the intake duct unit 82 extends so as to be curved outward of the motorcycle body towards the rear, and connects to the supercharger 42. A portion of the inner side surface 70*i* of the air intake duct 70, specifically, an inner side surface of the curved portion extends outward towards the rear. Since the inner side surface of the curved portion is tiled outward as described above, reduction of a flow velocity in the inner side portion of the air intake duct 70 can be suppressed.

Specifically, the air intake duct 70 is curved in the vertical direction and the widthwise direction. That is, the air intake duct 70 extends so as to be curved downward towards the rear, and extends so as to be curved outward in the motorcycle widthwise direction. The air intake duct 70 is curved so as to have a complicated curved shape due to various causes. Specifically, the air intake duct 70 is curved so as not to interfere with a leg of a rider as shown in FIG. 1, curved such that the incoming wind A that has passed through the radiator 13 is not blocked by the air intake duct 70, curved so as not to interfere with the steering handle 6 and the front fork 8 in steering operation, or curved such that the intake air I smoothly flows through the air intake duct 70.

The air intake duct 70 shown in FIG. 1 passes below the tip end portion of the steering handle 6 and above the radiator 13 and passes laterally by the outer side of the front fork 8 in a region frontwardly of the combustion engine E, as viewed from the side thereof. Specifically, the air intake duct 70 passes below a region in which the steering handle 6 performs rotational movement. Thus, interference between the air intake duct 70 and the steering handle 6 can be prevented. Further, the air intake duct 70 passes above a space rearwardly of the radiator 13. Thus, the space rearwardly of the radiator 13 can be opened in the motorcycle widthwise direction, and as a result, the incoming wind A that passes through the radiator 13 is smoothly discharged. The lower end of the air intake duct 70 near the radiator 13 is preferably disposed above a rotary shaft of a fan (not shown) of the radiator 13, and more preferably disposed above the upper end of the fan (not shown). Further, the air intake duct 70 passes above the exhaust pipes 36 frontwardly of the combustion engine E.

Further, the air intake duct 70 extends rearwardly below the fuel tank 15 and laterally of the outer side of the main frame 1. Thus, a capacity of the fuel tank 15 can be ensured, and interference between the air intake duct 70 and the main frame 1 can be avoided. Further, for example, a wiring harness or the piping portion fixed to the main frame 1 can be hidden by the air intake duct 70.

Further, in a region lateral to the combustion engine E, the air intake duct 70 passes above the crankshaft 26, specifically, passes above a generator cover 29 mounted to a left side portion of the crankcase 28 and below the upper surface of the cylinder head 32 and the throttle body 76, as viewed from the side. A portion of the side surface and a portion of the upper surface of the intake duct unit 82 are exposed to the outside. Further, the rear end of a portion, of the air intake duct 70, which projects from the main frame 1 is disposed, below the knee K of a rider seated on the motorcycle and forwardly of a below-knee portion KU.

Thus, since the air intake duct 70 extends below the upper surface of the cylinder head 32 in the region lateral to the combustion engine, the air intake duct 70 need not be sharply curved downward so as to connect to the cleaner inlet 60 (FIG. 2). Accordingly, a radius of curvature of the air intake duct 70 can be increased, as compared to a case where the air intake duct 70 passes above the upper surface of the cylinder head 32. Further, since the air intake duct 70 passes below the throttle body 76 in the region lateral to the combustion engine E, interference with components, such as a throttle valve driving mechanism or a sensor, provided in opposite side portions of the throttle body 76 can be prevented, and the air intake duct 70 can be extended to the inner side portion in the motorcycle widthwise direction to the maximum extent. Further, since the air intake duct 70 extends above the generator cover 29, interference between the air intake duct 70 and the generator cover 29 can be prevented.

Figure 7:
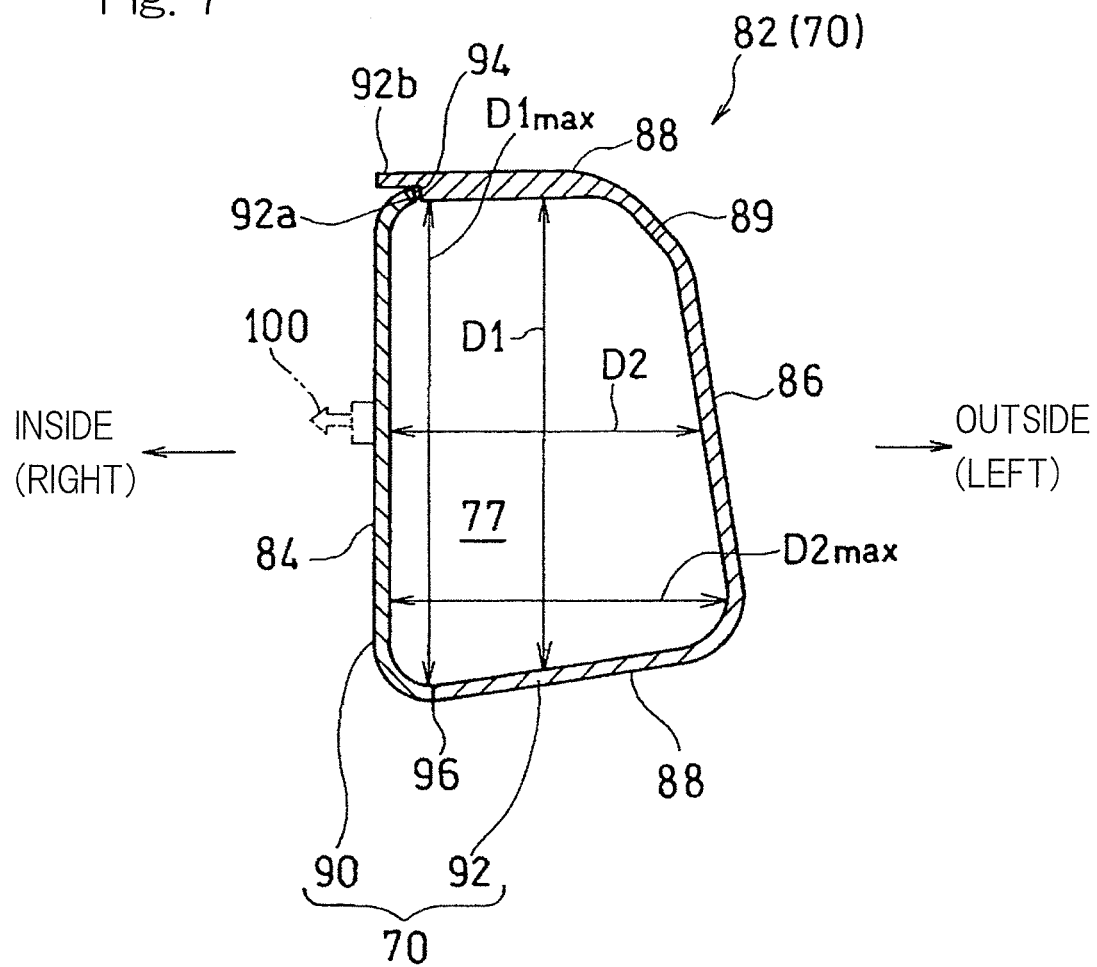
FIG. 7 is a cross-sectional view as taken along a line VII-VII in FIG. 3.

As shown in FIG. 7, the air intake duct 70 is dividable into two parts of a left part and a right part, and includes an inner half part 90 and an outer half part 92. The inner half part 90 and the outer half part 92 are each formed so as to have a U-shaped cross-section. Thus, molding is facilitated and strength can be assuredly obtained. Specifically, the outer half part 92 is formed such that a cross-sectional shape thereof perpendicular to the front-rear direction is a U-shape that is opened inward in the motorcycle widthwise direction. On the other hand, the inner half part 90 is formed such that a cross-sectional shape thereof perpendicular to the front-rear direction is a U-shape that is opened outward in the motorcycle widthwise direction. The cross-sectional shape of each of the outer half part 92 and the inner half part 90 is not necessarily limited to a U-shape. For example, the outer half part 92 and the inner half part 90 may be each formed so as to have an L-shaped cross-section, or the inner half part 90 may be formed so as to have an I-shaped cross-section.

A material or a surface treatment is different between the outer half part 92 and the inner half part 90. For the outer half part 92, such a material or a surface treatment as to improve an outer appearance is necessary. On the other hand, for the inner half part 90, conditions such as strength or production cost, other than an outer appearance, are more important. When a material or a surface treatment is made different therebetween, requirements for each of the outer half part 92 and the inner half part 90 can be fulfilled. In the present embodiment, the outer half part 92 is formed by a material obtained by coloring an ABS resin (acrylonitrile-butadiene-styrene copolymer synthetic resin), and the inner half part 90 is formed from a polypropylene (PP). However, the material of each of the outer half part 92 and the inner half part 90 is not necessarily limited to the above materials.

On the surface (the inner side surface of the intake duct 70) of the inner half part 90, a fixing portion 100 for attaching the air intake duct 70 to the main frame 1 is formed. The ram duct unit 80 shown in FIG. 6 is fixed to the front cowl 22, so that the front portion of the air intake duct 70 is supported by the motorcycle body. The rear portion of the air intake duct 70 is connected to the air cleaner 40 by means of the bolts 55 (FIG. 2), and thus, is supported by the motorcycle body. The number of the fixing portions 100 shown in FIG. 7 may be plural as necessary, thereby supporting the intermediate portion, in the front-rear direction, of the air intake duct 70 by the motorcycle body.

The outer half part 92 and the inner half part 90 are joined to each other in a state where an inner side end portion of the outer half part 92 and an outer side end portion of the inner half part 90 face or butt each other. The inner half part 90 and the outer half part 92 are joined to each other by means of, for example, melt-bonding or adhesion. The inner side end portion, on the upper side, of the outer half part 92 has: a joining portion 92a that butts the outer side end portion of the inner half part 90; and a projection 92b formed above the joining portion 92a and projecting toward the inner side of the motorcycle body beyond the joining portion 92a. An upper dividing face 94 between the inner and outer half parts 90 and 92 is disposed inward of the intermediate position, in the widthwise direction, of the air intake duct 70. A lower dividing face 96 between the inner and outer half parts 90 and 92 is disposed outward of the upper dividing face 94 in the widthwise direction.

Figure 8A:
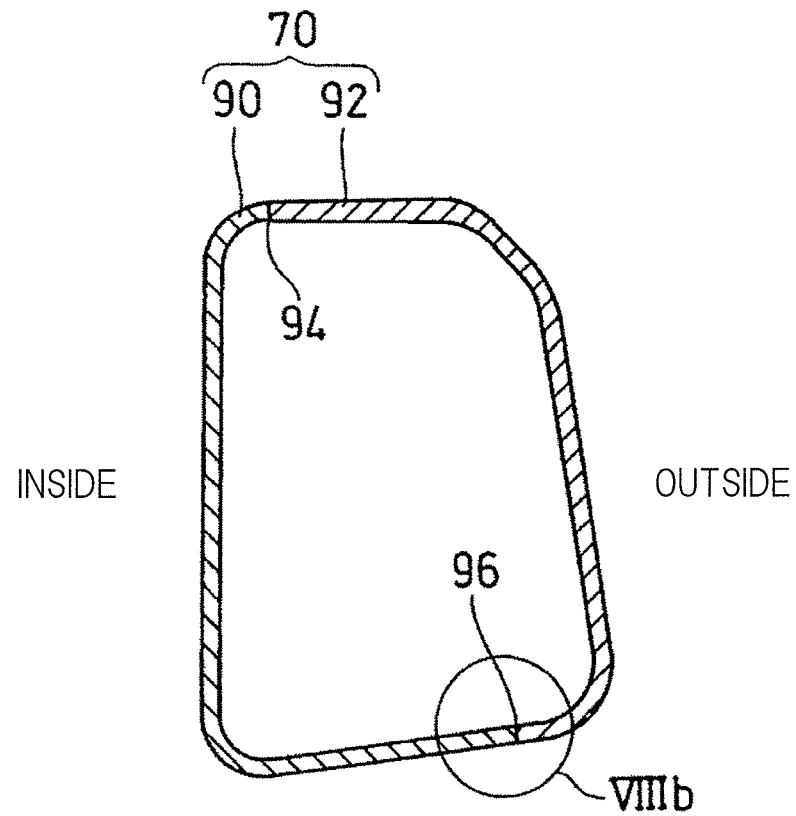
FIG. 8A is a cross-sectional view of another example of the air intake duct.
Figure 8B:
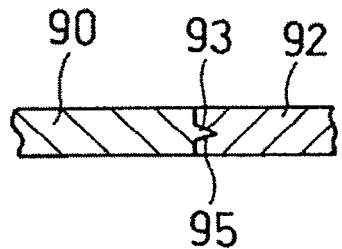
FIG. 8B is an enlarged view of a portion VIIIb of FIG. 8A.
Figure 8C:
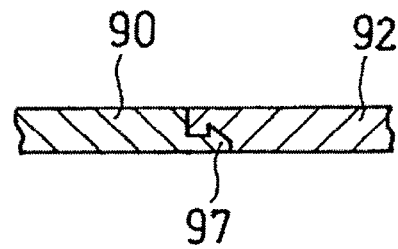
FIG. 8C illustrates another example of the portion VIIIb.

As shown in FIG. 8A, the lower dividing face 96 may be disposed outward of the intermediate portion, in the widthwise direction, of the air intake duct 70. Further, as shown in FIG. 8B, a joining portion between the inner half part 90 and the outer half part 92 may be formed such that, a protrusion 93 of the inner half part 90 may be fitted into a recess 95 of the outer half part 92. Thus, strength at the joining portion is enhanced. Further, as shown in FIG. 8C, a return portion 97 for preventing disengagement in the widthwise direction at the joining portion may be provided in one of the inner and outer half parts 90 and 92.

A transverse cross-sectional shape of the intake duct unit 82 forming the air intake passage 77 shown in FIG. 7 is a rectangular shape that has a longitudinal axis extending almost in the vertical direction. In the curved portion, a transverse cross-section of the intake duct unit 82 is formed so as to have such a shape that a dimension D1 in the orthogonal direction (dimension in the vertical direction in the transverse cross-section) orthogonal or perpendicular to the radial direction of the curve portion is gradually reduced from the center side of the curve portion (the inner side of the motorcycle body) toward the outer side in the motorcycle widthwise direction. The latter side corresponds to the outer side, in the radial direction, of the curve portion. The above identified orthogonal direction is perpendicular to the motorcycle widthwise direction. In the description herein, "gradually reduced" means that the dimension may be reduced as a whole and may include a portion having a partially constant dimension. The intake duct unit 82 may have, for example, a D-shaped cross-section, a V-shaped cross-section, or a trapezoidal cross-section in which an outer side edge projects or bulges in the radial direction (outward in the motorcycle widthwise direction) of the curve portion so as to form an arcuate shape.

Such a dimension-reducing shape that has the dimension D1, in the orthogonal direction, which is gradually reduced towards the outside, may be formed over the entirety of the duct, and however, such a dimension-reducing shape may be preferably formed in at least a region in which the curvature is increased, or may be formed only in such a region in which the curvature is increased. Specifically, the duct rear portion 70b, at which the flowing direction of the intake air I substantially changes from the front-rear direction to the widthwise direction in the air intake duct 70, is preferably formed as a dimension-reducing shape.

Although, in the present embodiment, the air intake duct 70 is curved in the widthwise direction, shape of the air intake duct 70 is not necessarily limited thereto. For example, where the air intake duct 70 passes above the combustion engine E in the front-rear direction and is curved in the vertical direction, the air intake duct 70 is formed as such a dimension-reducing shape that the dimension in the widthwise direction in the curved portion is reduced upwardly.

The transverse cross-section is shaped, in the curved portion of the air intake passage 77 in the intake duct unit 82, such that a maximum value D1max of the dimension D1 in the orthogonal direction is set so as to be greater than a maximum value D2max of a dimension D2 in the radial direction (dimension in the widthwise direction) along the radial direction of the curve portion (D1max>D2max). In other words, the transverse cross-section of the intake duct unit 82 is formed by a duct inner side line 84 on the center side of the curve portion, a duct outer side line 86 on the outer side, in the radial direction, of the curve portion, and duct connecting lines 88, 88 that connect between the duct inner side line 84 and the duct outer side line 86, in which a dimension, in the orthogonal direction, of the duct outer side line 86 is set so as to be less than that of the duct inner side line 84. Thus, since the dimension in the vertical direction is set so as to be greater than the dimension in the motorcycle widthwise direction, extension of the air intake duct 70 in the motorcycle widthwise direction can be prevented, while an area of the passage can be increased. The dimension D1 in the orthogonal direction and the dimension D2 in the radial direction correspond to the dimension H, in the vertical direction, of the cross-section of the air intake duct 70, and the dimension W, in the widthwise direction, of the cross-section of the air intake duct 70, respectively, as shown in FIG. 4 and FIG. 5.

A chamfered portion 89 is formed at the corner, on the upper-outer side, of the cross-section of the air intake duct 70 having almost a rectangular shape. Thus, reduction of a flow velocity at the corner can be prevented. Further, in the cross-section of the air intake duct 70, an inner surface of the inner half part 90 and an inner surface of the outer half part 92 are formed so as to be flush with each other. Also by this configuration, a drag in the flow passage can be reduced.

A part of the outer side surface of the air intake duct 70 shown in FIG. 1 is exposed to the outside in the motorcycle widthwise direction. In the present embodiment, a portion, of the air intake duct 70, exposed to the outside in the motorcycle widthwise direction passes outside the motorcycle frame structure FR in the motorcycle widthwise direction near the steering handle 6. Specifically, the portion exposed to the outside extends from a vicinity of the steering handle 6 to a vicinity of the rear portion of the combustion engine E in the front-rear direction. Thus, visibility of the side surface of the air intake duct 70 from a rider or the outside is enhanced. Since no partition line or dividing line along the dividing face 94 or 96 in FIG. 7 is formed on the side surface of the air intake duct 70 as described above, a partition line is difficult to see from a rider or the outside. Thus, an outer appearance of the motorcycle is improved.

As shown in FIG. 6, a part of the upper surface of the air intake duct 70 is also exposed upwardly of the motorcycle body. In the present embodiment, a portion, of the air intake duct 70, exposed at upwardly of the motorcycle body passes outside the motorcycle frame structure FR in the motorcycle widthwise direction near the steering handle 6. Specifically, the portion exposed upwardly extends from the vicinity of the steering handle 6 to the vicinity of the rear portion of the combustion engine E in the front-rear direction. Thus, visibility of the upper surface of the air intake duct 70 from a rider or the outside of the motorcycle is enhanced. Since the partition line 94 on the upper surface of the air intake duct 70 is formed on the inner side as described above, the partition line 94 is difficult to see from a rider or the outside. Thus, an outer appearance of the motorcycle is improved.

Where the air intake duct 70 is partially hidden on the inner side in the motorcycle widthwise direction by the motorcycle frame structure or the cowl in a planer view, the partition line may be displaced outward in the motorcycle widthwise direction within a range in which the partition line is hidden by the motorcycle frame structure or the cowl in the planer view. Thus, an outer appearance is maintained excellent, and enhancement of strength is facilitated. For example, the partition line may be extended along a boundary of the region hidden by the motorcycle frame structure or the cowl.

When the crankshaft 26 shown in FIG. 1 rotates, power of the combustion engine E is transmitted through the transmission mechanism 54 to the supercharger 42, to actuate the supercharger 42. When the motorcycle travels, the incoming wind A is introduced from the air intake port 24 and flows in the ram duct unit 80 and then the intake duct unit 82. Then, the incoming wind A is cleaned by the air cleaner 40, and is introduced into the supercharger 42. The incoming wind A having been introduced into the supercharger 42 is pressurized by the supercharger 42 and is supplied through the air intake chamber 74 and the throttle body 76 into the combustion engine E. By a synergistic effect of the ram pressure and pressurizing by the supercharger 42 as described above, high-pressure intake air can be supplied to the combustion engine E.

In the above structure, the passage on the outer side, in the radial direction, of the curve portion is narrower than the passage on the inner side, in the radial direction, of the curve portion in the air intake passage 77 shown in FIG. 7. Therefore, the intake air I is less likely to be deflected outward in the radial direction of the curve portion due to a centrifugal force, and a flow of the intake air I is made even in the air intake passage 77. Thus, the passage is connected to the suction port 46 of the supercharger 42 such that the flow of the intake air I is made even, and therefore, reduction of an efficiency of the supercharger 42 can be prevented.

Further, the transverse cross-section of the air intake passage is shaped such that a maximum dimension D1max in the orthogonal direction is set so as to be greater than the maximum dimension D2max in the radial direction of the curve portion. Thus, reduction of unevenness in the flow velocity is facilitated as compared to a case where the maximum dimension in the radial direction is greater than the maximum dimension in the orthogonal direction.

As shown in FIG. 1, since the incoming wind A is taken in through the air intake port 24 that is opened forward, a flow velocity is increased to obtain a high dynamic pressure, while influence of a centrifugal force is likely to be exerted. However, as described above, since unevenness of the intake air I is reduced, reduction of an efficiency of the supercharger 42 can be prevented.

The supercharger 42 shown in FIG. 2 is disposed rearwardly of the cylinder block 30 of the combustion engine E, and the air intake duct 70 extends so as to be curved from the front of the cylinder block 30 toward the left side of the motorcycle body, and pass laterally of the left side of the cylinder block 30, to be connected to the supercharger 42. Thus, since the air intake duct 70 is curved in the lateral direction, the dimension, in the vertical direction, of the motorcycle can be reduced, as compared to a case where the air intake duct passes above the cylinder block 30.

The air intake port 24 of the air intake duct 70 shown in FIG. 6 is disposed on the left side of the motorcycle body, and the outermost side end 24a, in the motorcycle widthwise direction, of the air intake port 24 is disposed outward of the inner side surface 70i, in the motorcycle widthwise direction, of an outermost curved portion of the air intake duct 70. Accordingly, since the curve of the air intake duct 70 can be reduced, deflection of the flow rate of the intake air I in the motorcycle widthwise direction can be reduced, and also a dimension of the motorcycle in the motorcycle widthwise direction can be reduced.

The suction port 46 of the supercharger 42 shown in FIG. 2 is disposed inward of the left side surface of the combustion engine E in the motorcycle widthwise direction. In a case where the suction port 46 is disposed inward of the combustion engine E, the supercharger 42 does not project laterally outward of the left side surface of the combustion engine E, and therefore, an assembly of the combustion engine E and the supercharger 42 can be made compact, while a curvature of the air intake duct 70 may be increased, and a centrifugal force may be increased. However, as described above, unevenness of the intake air I is reduced, and therefore, reduction of an efficiency of the supercharger 42 can be prevented. Further, deflection, in the motorcycle widthwise direction, of the intake air I introduced from the air intake port 24 toward the supercharger 42 is reduced, and therefore, unevenness of the flow is reduced to enhance an air intake efficiency.

Further, the passage area of the air intake passage is set so as to be gradually reduced from the upstream side toward the downstream side. Thus, a flow velocity of the intake air I is gradually increased towards the downstream side. As a result, a flow velocity is not reduced near the suction port 46 of the supercharger 42, and a high efficiency of the supercharger 42 can assuredly be obtained. Further, since the flow velocity of the intake air I is gradually increased, unevenness of the flow is reduced, and therefore, an air intake efficiency is also high. In this case, although an influence of a centrifugal force is likely to be exerted near the suction port 46 of the supercharger 42 at which a flow velocity is high, as described above, unevenness of the intake air I is reduced, and therefore, reduction of an efficiency of the supercharger 42 can be prevented.

The cleaner element 69 is disposed upstream of the suction port 46 of the supercharger 42 as shown in FIG. 2. Since unevenness of the intake air I in the air intake passage is reduced by the cleaner element 69, unevenness of the intake air I introduced into the supercharger 42 is reduced, and therefore, reduction of an efficiency can effectively be prevented.

As shown in FIG. 7, the air intake duct 70 is dividable into two parts of the left part and the right part, and therefore, the air intake duct 70 can be formed by molding. As a result, even in a case where the air intake duct 70 is curved in the vertical direction and in the widthwise direction, the air intake duct 70 can be easily formed.

Although a part of the side surface of the air intake duct 70 shown in FIG. 6 is exposited to the outside, no partition line is provided on the side surface. Therefore, even in a case where the air intake duct 70 is exposed, the outer appearance is not degraded.

The upper dividing face 94 of the air intake duct 70 shown in FIG. 7 is disposed inward of the intermediate position, in the motorcycle widthwise direction, of the air intake duct 70. Therefore, even in a case where a part of the upper surface of the air intake duct 70 is exposed to the outside, the inner half part 90 is less likely to be exposed to the outside. As a result, only the outer half part 92 can be formed as a design component to improve an outer appearance, while the inner part can be produced at low cost.

As shown in FIG. 1, in a case where the air intake duct 70 passes above the radiator 13 or passes laterally of the outer side of the front fork 8, the air intake duct 70 can be easily seen from a rider. However, as described above, the upper dividing face 94 is disposed on the inner side of the motorcycle body, and therefore, the partition line may not be outstanding.

Since the lower dividing face 96 shown in FIG. 7 is disposed outward of the upper dividing face 94 in the motorcycle widthwise direction, the inner half part 90 is less likely to be flattened, and therefore, rigidity of the air intake duct 70 can be enhanced.

The outer half part 92 and the inner half part 90 are joined to each other in a state where the inner side end portion of the outer half part 92 and the outer side end portion of the inner half part 90 face or butt each other. Therefore, an uneven portion may not be formed in the inner peripheral surface of the air intake duct 70, and as a result, a flow of the intake air I in the air intake duct 70 is not inhibited.

The inner side end portion, on the upper side, of the outer half part 92 includes: the joining portion 92a that butts the outer side end portion of the inner half part 90; and the projection 92b formed above the joining portion 92a and projecting toward the inner side of the motorcycle body beyond the joining portion 92a. Thus, the joining portion 92a on the upper side is hidden by the projection 92b to improve an outer appearance.

The fixing portion 100 for mounting the air intake duct 70 to the main frame 1 is formed on the outer surface (inner side surface) of the inner half part 90. Therefore, the fixing portion 100 is prevented from appearing in the outer appearance of the motorcycle body, and the outer appearance of the motorcycle body can be prevented from being degraded.

In a case where the air intake duct 70 shown in FIG. 1 is disposed on the left side of the motorcycle body, on which the side stand 17 is also disposed, the upper dividing face 94 is easily seen when the motorcycle is at stoppage. However, since the air intake duct 70 is disposed at a lower side of tilt when the motorcycle is at stoppage, the partition line may not be outstanding.

In the downstream portion 70c of the air intake duct 70 shown in FIG. 2, the connecting portion 67 having an increased passage area is provided. Since the intake air I is accumulated in the connecting portion 67, the intake air I can be stably supplied to the supercharger 42.

Further, the cleaner element 69 is disposed at the connecting portion 67, and the cleaner outlet 62 connected to the supercharger 42 at the connecting portion 67 is set so as to have a passage area that is less than the area at which the cleaner element 69 is arranged. As a result, a velocity of the intake air I is reduced at the air cleaner 40, and therefore, loss in passing through the cleaner element 69 is reduced. Further, since a passage area of the cleaner outlet 62 of the air cleaner 40 is set so as to be reduced, a velocity of the intake air I is increased at the cleaner outlet 62, and therefore, reduction of an efficiency of the supercharger 42 due to reduction of a flow velocity of the intake air I near the suction port 46 of the supercharger 42 can not be avoided.

The opening edge of the air intake port 24 shown in FIG. 6 is tiled outward in the motorcycle widthwise direction towards the rear in a planer view. Thus, a streamline shape of the motorcycle body is maintained while an opening area of the air intake port 24 can be increased.

Since the air intake duct 70 shown in FIG. 1 passes laterally of the left side of the cylinder block 30, a wide space can be assuredly obtained above the combustion engine E, to improve freedom in designing. Further, since the air intake duct 70 extends frontwardly of the steering handle 6 and then, above the radiator 13, interference with the radiator 13 can be avoided. As a result, deterioration in performance of the radiator can be prevented.

Further, since the air intake duct 70 passes below the tip end portion of the steering handle 6, interference of the air intake duct 70 with the steering handle 6 that is performing rotational movement can be prevented.

The air intake duct 70 projects laterally outward of the main frame 1 frontwardly of the knee grip portion 75 shown in FIG. 6, and the rear end of a portion, of the air intake duct 70, which projects outward of the main frame 1 is positioned below the knee K of a rider seated on the motorcycle and frontwardly of the below-knee portion KU as viewed from the side thereof, as shown in FIG. 1. Thus, interference of the air intake duct 70 with the knee K of a rider can be prevented.

Further, since the air intake duct 70 has the lowermost portion 70*d* at its intermediate portion in the flow direction, drainage can be performed in the lowermost portion 70*d*.

Figure 9:
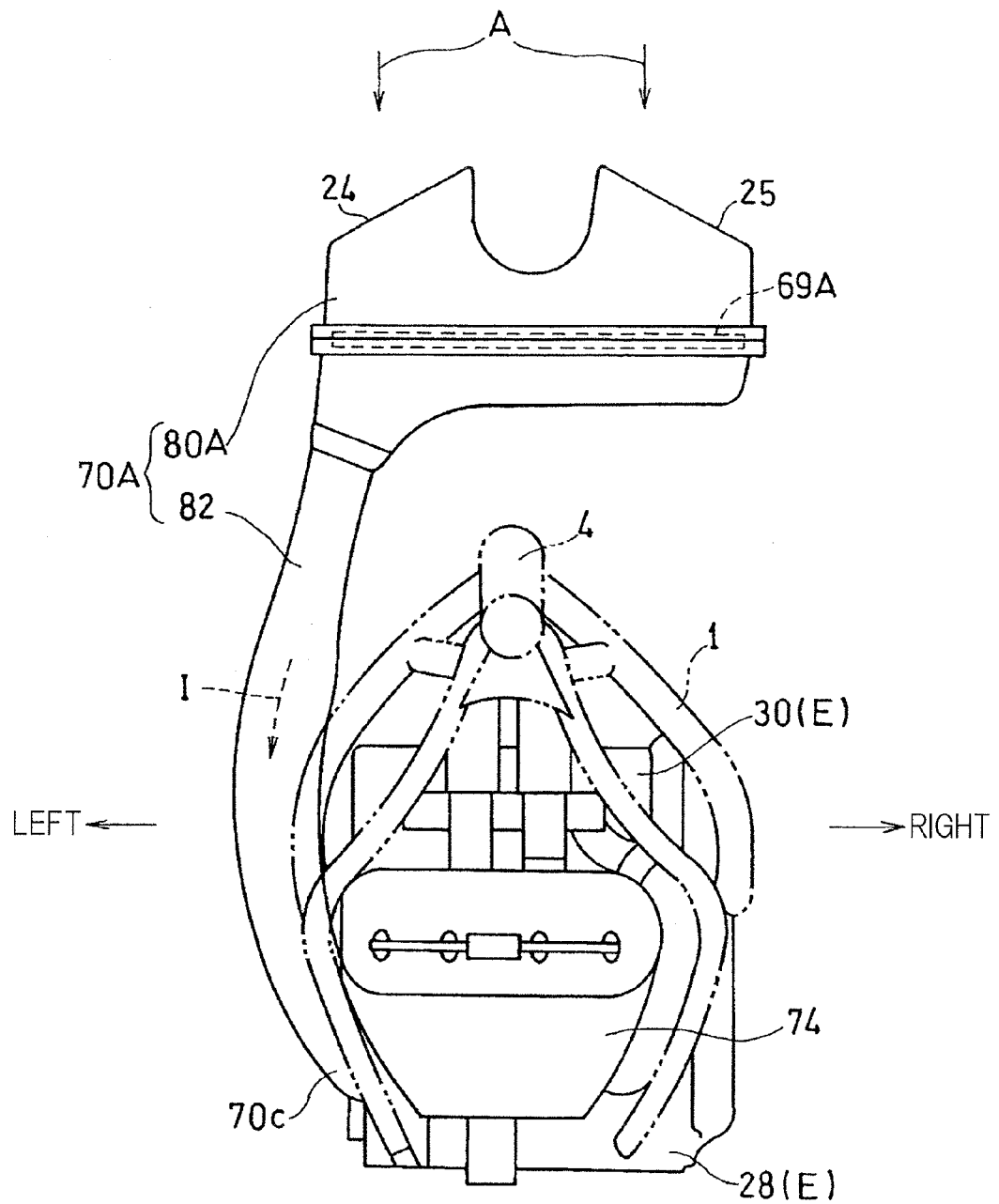
FIG. 9 is a plan view of a main portion of a motorcycle, which is one type of a saddle-riding type vehicle, having an air intake duct mounted thereto according to a second embodiment of the present invention.

FIG. 9 is a plan view of a main portion of a motorcycle, which is one type of a saddle-riding type vehicle, having an air intake duct mounted thereto according to a second embodiment of the present invention. An air intake duct 70A of the second embodiment includes, in addition to the air intake port 24 on the left side that is one side of the motorcycle body, an additional air intake port 25 on the right side that is the other side of the motorcycle body. Further, a cleaner element 69A for cleaning intake air is incorporated in a connecting portion between a ram duct unit 80A and the intake duct unit 82. Therefore, the downstream portion 70*c* of the air intake duct 70A has no cleaner element (air cleaner). The other structures are the same as those of the first embodiment.

According to the second embodiment, since the additional air intake port 25 is provided, an amount of intake air of the incoming wind A is increased. Further, since the cleaner element 69A is disposed on the upstream side of the air intake passage having an increased passage area, the intake air I passes through the cleaner element 69A a low flow velocity. Thus, loss in passing through the cleaner element 69A can be reduced.

Figure 10:
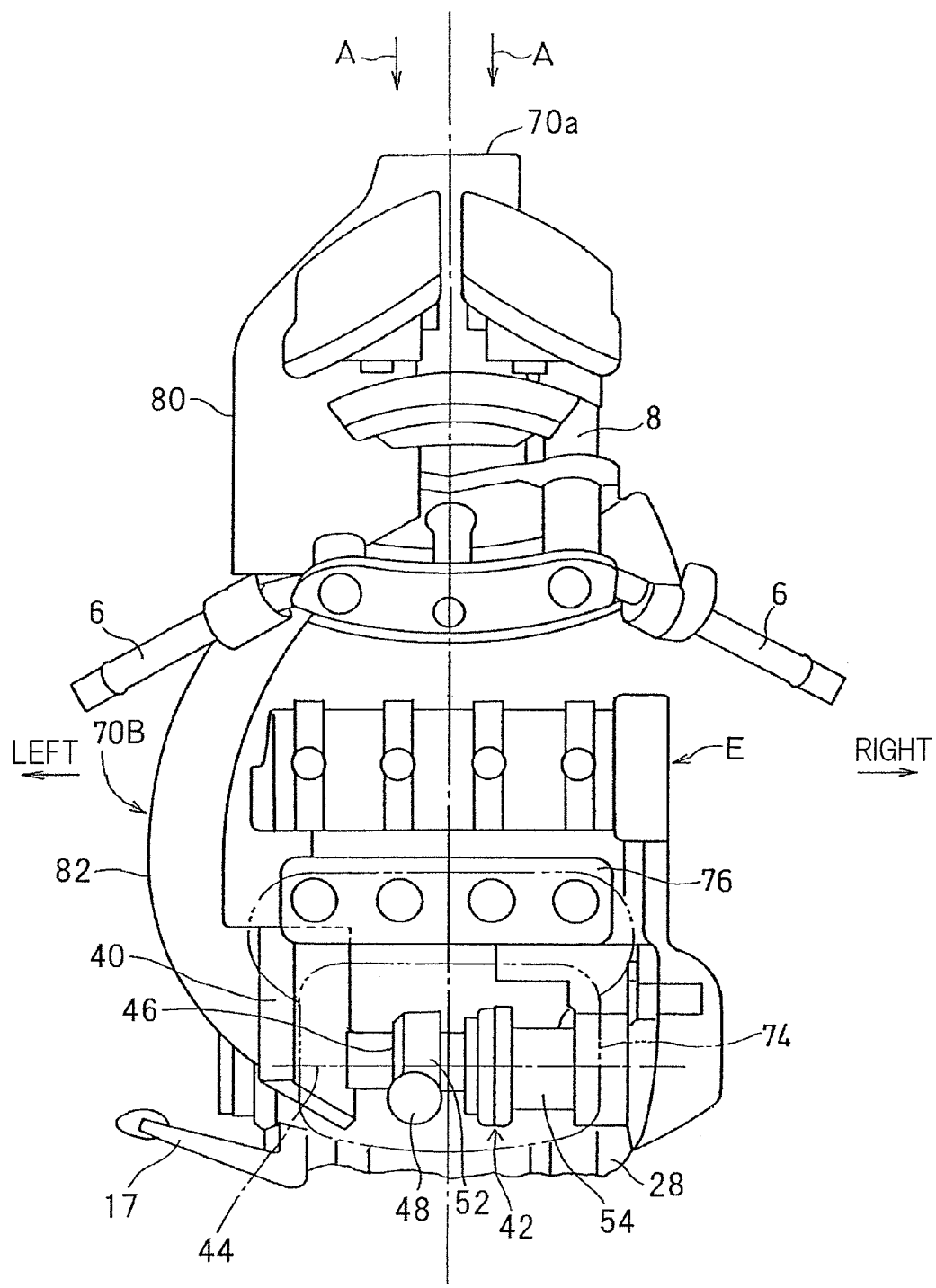
FIG. 10 is a plan view of a main portion of a motorcycle, which is one type of a saddle-riding type vehicle, having an air intake duct mounted thereto according to a third embodiment of the present invention.
Figure 11:
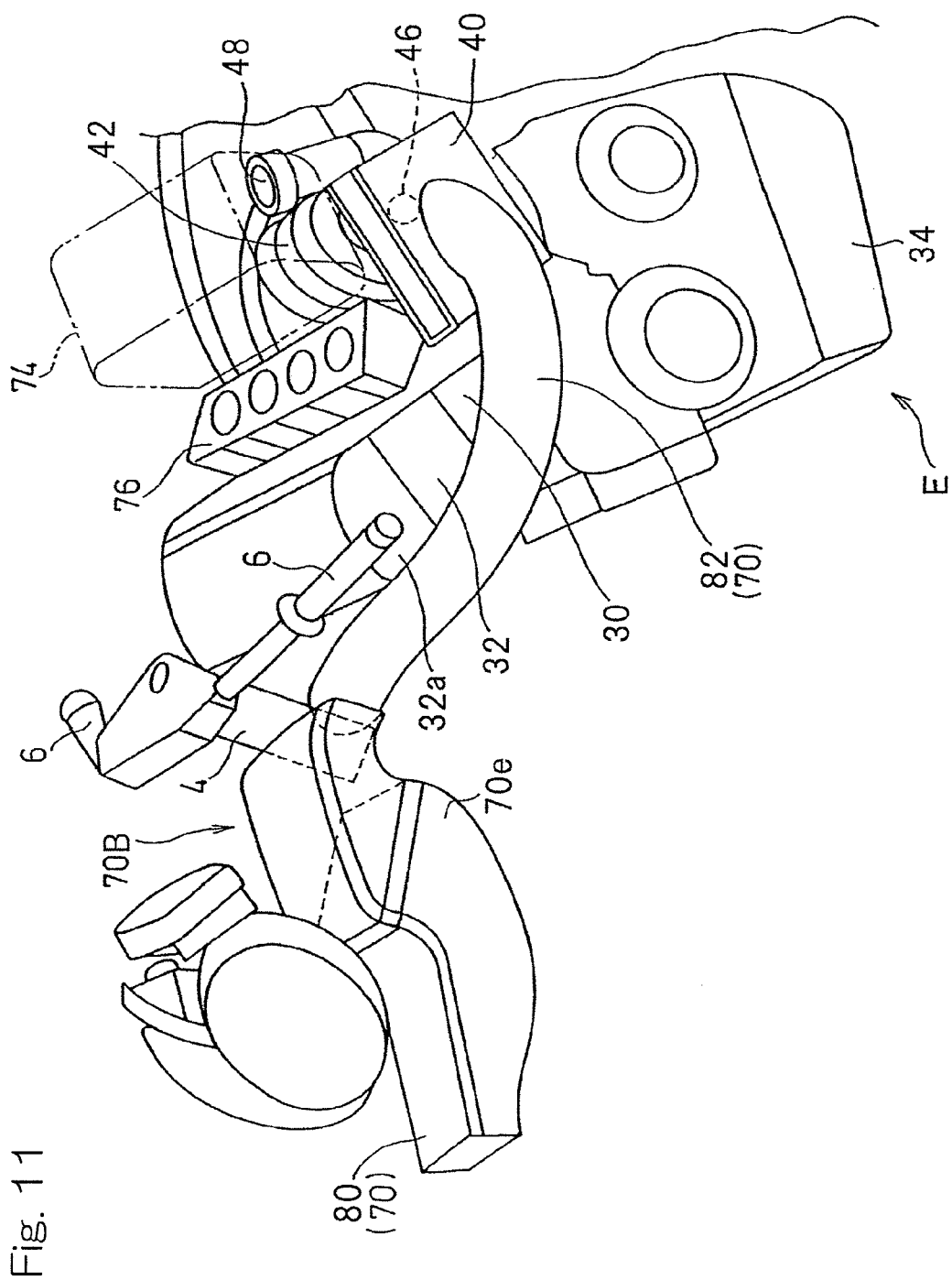
FIG. 11 is a perspective view of a main portion of the motorcycle as viewed from diagonally above a front portion thereof.

FIG. 10 is a plan view of a main portion of a motorcycle, which is one type of a saddle-riding type vehicle, having an air intake duct mounted thereto according to a third embodiment of the present invention, and FIG. 11 is a perspective view thereof. An air intake duct 70B of the third embodiment has an introduction port 70*a* disposed at the intermediate position, in the motorcycle widthwise direction, of the front end of the motorcycle body. Further, the intake duct unit 82 is implemented as a cylindrical pipe, and has such a straight shape as to smoothly extend downward towards the rear as viewed from the side. Therefore, the air intake duct 70B of the third embodiment does not include the lowermost portion 70*d* at the intermediate portion in the front-rear direction as in the first embodiment. However, the air intake duct 70B has a tilted portion 70*e* that is formed at the front portion so as to be raised upward towards the rear. Thus, water contained in the intake air I can be reduced. The other structures are the same as those of the first embodiment. Also in the third embodiment, the same effect as that of the first embodiment is obtained.

Figure 12:
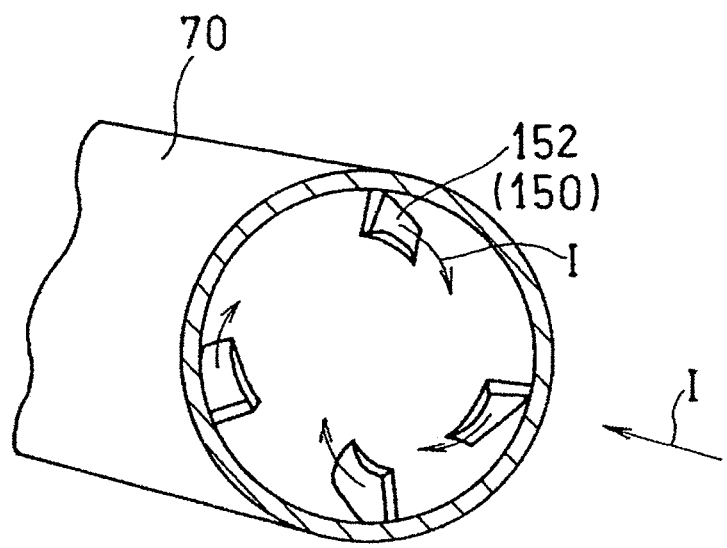
FIG. 12 is a cross-sectional view of an example of an air intake duct that is different from those of the first to the third embodiments.

In each embodiment described above, each of the air intake ducts 70, 70A, 70B may have thereinside an introduction member 150 for introducing the intake air I to the suction port 46 of the supercharger 42. The introduction member 150 is implemented as, for example, a guide plate 152 integrated with an inner surface of the air intake duct 70 as shown in FIG. 12. When the introduction member 150 is provided, the intake air I is stably introduced to the supercharger 42, and therefore, an efficiency of the supercharger 42 is enhanced.

Further, the air intake duct 70 may be fixed to the motorcycle body by means of flange portions formed on the front end portion and the rear end portion. Each flange portion has a bolt insertion hole into which a bolt is inserted from the outer lateral side. Each flange portion may be formed on either of the inner half part and the outer half part. Further, for example, the rear-side flange portion may be formed in the inner half part and the front-side flange portion may be formed in the outer half part. In this case, the flange portion formed on the outer half part is preferably disposed at such a position as to be hidden from the outside by the front cowl. Further, in a case where the flange portion is formed on the outer half part, when the flange portion is formed in the lower portion of the outer half part, the flange portion may not be outstanding. When each of the inner half part and the outer half part has the flange portion formed thereon, a supporting strength at a joining portion between the inner half part and the outer half part can be reduced, and therefore, strength can be enhanced.

The present invention is not limited to the embodiment described above, and various additions, modifications, or deletions may be made without departing from the gist of the invention. For example, the air intake duct of the present invention is also applicable to saddle-riding type vehicles other than motorcycles, and is also applicable to three-wheeled vehicles or four-wheeled vehicles. Therefore, these are construed as included within the scope of the present invention.

REFERENCE NUMERALS

8 . . . front fork
13 . . . radiator
17 . . . side stand
42 . . . supercharger
70, 70A, 70B . . . air intake duct
90 . . . inner half part
92 . . . outer half part
92*a* . . . joining portion
92*b* . . . projection
94 . . . upper dividing face
96 . . . lower dividing face
100 . . . fixing portion
A . . . incoming wind
E . . . combustion engine
FR . . . motorcycle frame structure
I . . . intake air

What is claimed is:

1. An air intake duct of a saddle-riding type vehicle which extends rearwardly from a front portion of a vehicle body so as to pass laterally by one side of a vehicle body frame structure in a widthwise direction of the vehicle, and through which incoming wind is supplied as an intake air to a combustion engine, the air intake duct comprising:
    an outer half part and an inner half part divided in the widthwise direction;
    an outer side surface, a part of which is exposed to the outside in the widthwise direction, wherein:
    the outer half part and the inner half part are joined to each other such than an inner side end portion of the outer half part and an outer side end portion of the inner half part butt against each other; and
    the inner side end portion, on an upper side, of the outer half part includes a joining portion that butts the outer side end portion of the inner half part and a projection formed above the joining portion and projecting toward the inner side of the vehicle body beyond the joining portion.

2. The air intake duct of a saddle-riding type vehicle as claimed in claim 1, wherein a part of a side surface of the air intake duct is exposed to the outside.

3. The air intake duct of a saddle-riding type vehicle as claimed in claim 1, wherein
the air intake duct includes an upper dividing face and a lower dividing face,
the intake air is supplied through a supercharger to the combustion engine,
the upper dividing face is disposed inward of an intermediate position, in the widthwise direction, of the air intake duct, and
a part of an upper surface of the air intake duct is exposed to the outside.

4. The air intake duct of a saddle-riding type vehicle as claimed in claim 3, wherein the air intake duct passes above a radiator for cooling water with which the combustion engine is cooled.

5. The air intake duct of a saddle-riding type vehicle as claimed in claim 3, wherein the air intake duct passes laterally of an outer side of a front fork.

6. The air intake duct of a saddle-riding type vehicle as claimed in claim 3, wherein the lower dividing face is disposed outward of the upper dividing face in the widthwise direction.

7. The air intake duct of a saddle-riding type vehicle as claimed in claim 3, wherein the outer half part and the inner half part are joined to each other such that an inner side end portion of the outer half part and an outer side end portion of the inner half part butt against each other.

8. The air intake duct of a saddle-riding type vehicle as claimed in claim 3, wherein a fixing portion for fixing the air intake duct to the vehicle body frame structure is formed on an outer surface of the inner half part.

9. The air intake duct of a saddle-riding type vehicle as claimed in claim 3, wherein the air intake duct is disposed on a lateral side on which a side stand is disposed.

10. The air intake duct of a saddle-riding type vehicle as claimed in claim 1, further comprising: an upper dividing face and a lower dividing face, wherein:
both of the upper and lower dividing faces are disposed inward of an intermediate position, in the widthwise direction, of the air intake duct; and
the air intake duct extends so as to be curved in the widthwise direction towards the rear.

11. The air intake duct of a saddle-riding type vehicle as claimed in claim 1, wherein the air intake duct has a transverse cross-sectional shape which is a rectangular shape.

12. The air intake duct of a saddle-riding type vehicle as claimed in claim 1, wherein an air cleaner forms a connecting portion of the air intake duct with an increased air flow passage area with a connecting portion formed by connecting flanges with an air cleaner element positioned between the connecting flanges.

13. The air intake duct of a saddle-riding type vehicle as claimed in claim 1 where the outer half part and the inner half part are molded from respectively different resin material.

14. The air intake duct of a saddle-riding type vehicle as claimed in claim 13 wherein a fixing portion for attaching the air intake duct to a main frame is formed on the inner half part.

15. An air intake duct of a saddle-riding type vehicle which extends rearwardly from a front portion of a vehicle body so as to pass laterally by one side of a vehicle body frame structure in a widthwise direction of the vehicle, and through which incoming wind is supplied as an intake air to a combustion engine,
the air intake duct comprising:
an outer half part and an inner half part divided in the widthwise direction;
an outer side surface, a part of which is exposed to the outside in the widthwise direction, wherein:
the air intake duct includes an upper dividing face and a lower dividing face,
the intake air is supplied through a supercharger to the combustion engine,
the upper dividing face is disposed inward of an intermediate position, in the widthwise direction, of the air intake duct,
a part of an upper surface of the air intake duct is exposed to the outside,
an inner side end portion, on an upper side, of the outer half part includes a joining portion that butts against the outer side end portion of the inner half part; and
a projection is formed above the joining portion to project toward the inner side of the vehicle body beyond the joining portion;
wherein the outer half part and the inner half part are joined to each other such that an inner side end portion of the outer half part and an outer side end portion of the inner half part butt against each other.

\* \* \* \* \*